United States Patent
Ahsan et al.

(10) Patent No.: US 10,275,103 B2
(45) Date of Patent: Apr. 30, 2019

(54) IDENTIFYING MULTIPLE USERS ON A LARGE SCALE PROJECTED CAPACITIVE TOUCHSCREEN

(71) Applicant: Elo Touch Solutions, Inc., Milpitas, CA (US)

(72) Inventors: Agha Ahsan, Milpitas, CA (US); Gazi Ali, Milpitas, CA (US); Khalid Azim, Milpitas, CA (US); Joel C. Kent, Fremont, CA (US); Kyu Tak Son, Milpitas, CA (US); Robert Williams, Milpitas, CA (US); Yansun Xu, Milpitas, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 15/677,058

(22) Filed: Aug. 15, 2017

(65) Prior Publication Data
US 2018/0011566 A1 Jan. 11, 2018

Related U.S. Application Data

(63) Continuation of application No. 14/871,496, filed on Sep. 30, 2015, now Pat. No. 9,740,352.

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .................... G06F 3/0416; G06F 3/044; G06F 2203/04104; G06F 2203/04106; G06F 2203/04108
See application file for complete search history.

(56) References Cited

U.S. PATENT DOCUMENTS 8,373,788 B2  2/2013  Ozawa et al.
8,994,674 B2  3/2015  Eguchi et al.
(Continued)

OTHER PUBLICATIONS

Harrison, et al., "Capacitive Fingerprinting: Exploring User Differentiation by Sensing Electrical Properties of the Human Body," UIST '12 Proceedings of the 25th Annual ACM Symposium on User Interface Software and Technology, Oct. 7-10, 2012; 7 pages.
(Continued)

*Primary Examiner* — Joe H Cheng
(74) *Attorney, Agent, or Firm* — Sterne, Kessler, Goldstein & Fox P.L.L.C.

(57) ABSTRACT

System, method, and computer program products are provided that can support touch interaction from multiple users on a large scale projective capacitive (PCAP) display system, such as a gaming table. According to some embodiments, a system includes a touchscreen coupled to a controller. The controller adjusts performance of the touchscreen through dynamically setting a controller parameter to support altered touch reporting in a first area of the touchscreen compared to a second area of the touchscreen. The controller enables touch detection for the first area according to performance characteristics needed for an application operating in the second area. Some embodiments include the controller identifying a user associated with the first area, where the controller receives and analyzes a watermarked touch signal from the first area that includes a touch signal and a unique signal, detects an associated touch location, and detects the unique signal associated with the user.

20 Claims, 8 Drawing Sheets

(56) References Cited

U.S. PATENT DOCUMENTS

| | | |
|---|---|---|
| 2008/0150906 A1 | 6/2008 | Grivna |
| 2009/0128516 A1 | 5/2009 | Rimon et al. |
| 2011/0221701 A1 | 9/2011 | Zhang et al. |
| 2011/0221924 A1* | 9/2011 | Kuma ................ H04N 5/23212 348/222.1 |
| 2011/0264491 A1 | 10/2011 | Birnbaum et al. |
| 2012/0146944 A1 | 6/2012 | Lee et al. |
| 2012/0223906 A1 | 9/2012 | Zhou |
| 2012/0229882 A1 | 9/2012 | Fish, Jr. et al. |
| 2013/0265246 A1 | 10/2013 | Tae |
| 2014/0160085 A1 | 6/2014 | Rabii et al. |
| 2014/0293338 A1 | 10/2014 | Murakami et al. |
| 2014/0304636 A1 | 10/2014 | Boelter et al. |
| 2014/0362007 A1* | 12/2014 | Jung ................... G06F 3/04883 345/173 |
| 2014/0365928 A1* | 12/2014 | Boelter ............... G06F 3/04883 715/765 |
| 2014/0365953 A1 | 12/2014 | Zambetti et al. |
| 2015/0009175 A1 | 1/2015 | Berget et al. |
| 2015/0040070 A1 | 2/2015 | Yamano et al. |
| 2015/0067344 A1 | 3/2015 | Poder et al. |
| 2015/0067540 A1 | 3/2015 | Yang et al. |
| 2015/0309601 A1* | 10/2015 | Izumi .................. G06F 3/04883 345/173 |
| 2016/0026277 A1* | 1/2016 | Zhang .................... G06F 3/044 345/173 |
| 2016/0077620 A1 | 3/2016 | Choi et al. |
| 2016/0195985 A1* | 7/2016 | Shinya ................. G06F 3/0418 345/173 |
| 2018/0188840 A1* | 7/2018 | Tamura .................. G06F 3/041 |

OTHER PUBLICATIONS

Moss, R., "Ideum Experiments with Tangible Interface on Projected Capacitive Touch Tables," Gizmag, Sep. 11, 2014; 4 pages.

3M Multi-Touch Displace C4667PW (46") product description, accessible at http://solutions.3m.com/wps/portal/3M/en_US/Electronics_NA/Electronics/Products/Electronics_Product_Catalog/~/3M-Multi-Touch-Display-C4667PW-46-?N=5153295+3294362046&rt=rud (last accessed Sep. 28, 2015); 2 pages.

International Search Report and Written Opinion of the International Searching Authority directed to related International Patent Application No. PCT/US16/53733, dated Dec. 27, 2016; 10 pages.

* cited by examiner

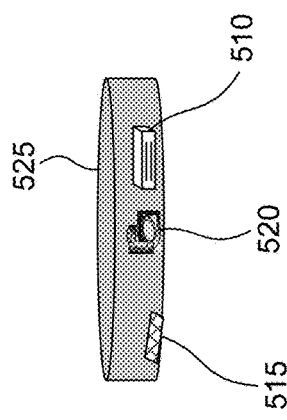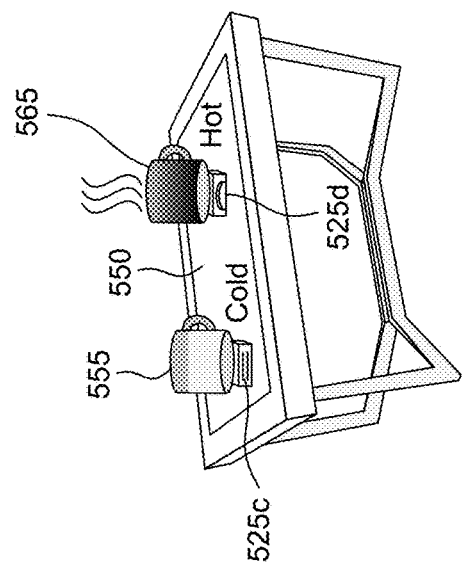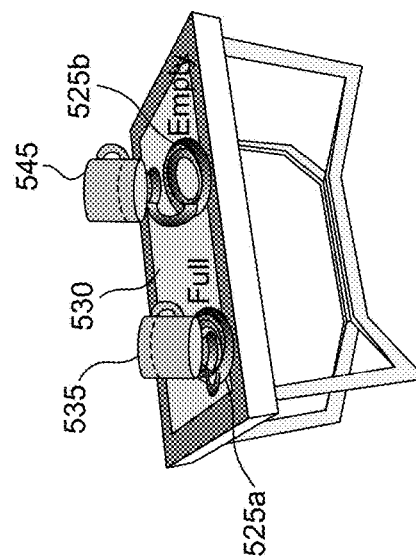

IDENTIFYING MULTIPLE USERS ON A LARGE SCALE PROJECTED CAPACITIVE TOUCHSCREEN

CROSS-REFERENCE TO RELATED APPLICATIONS

This application is a continuation of U.S. application Ser. No. 14/871,496, filed Sep. 30, 2015, now U.S. Pat. No. 9,740,352 B2, entitled Supporting Multiple Users on a Large Scale Projected Capacitive Touchscreen which is incorporated herein by reference in its entirety.

BACKGROUND

Field

The present disclosure relates generally to touch sensitive systems and more specifically to large scale display systems.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is utilized to support characteristics expected from touch interactions in small screen devices such as handheld devices, e.g., smartphones, tablets, etc. Translating those characteristics for use with larger screens and applications faces challenges.

One such challenge is to support touch interaction from multiple users on large scale display systems, such as a gaming table. A large scale PCAP touchscreen supporting with multiple users faces challenges of identifying individual users as they interact with the PCAP touchscreen and capturing touch data at a sufficient speed to support applications that utilize a high coordinate report rate (e.g., signature capture applications).

SUMMARY

System, method, and computer program product embodiments are provided that support multiple users interacting on a large scale projective capacitive (PCAP) touchscreen. Some embodiments include a controller coupled to a touchscreen, where the controller adjusts performance of the touchscreen through dynamically setting a controller parameter to support altered touch reporting in at least one first area of the touchscreen relative to a second area of the touchscreen. The controller enables touch detection for the at least one first area according to performance characteristics associated with an application operating in the second area, and identifies a user associated with the at least one first area. To identify the user, the controller receives and analyzes a watermarked touch signal from the at least one first area, where the watermarked touch signal comprises a touch signal and a unique signal. The controller also detects a touch location associated with the touch signal, and the unique signal that is associated with the user.

In some embodiments, the unique signal is associated with one drive frequency of the controller and wherein a second unique signal is associated with a different drive frequency of the controller. The unique signal may be associated with a unique code that may be an orthogonal code. In some embodiments, the unique signal may be associated with a unique combination of a drive frequency of the controller and a code, where the code may be an orthogonal code.

To detect the unique signal, the controller receives the unique signal and an identifier of the user from a device that the user touches. The controller associates the identifier of the user with the device, and positions the first area to be in proximity to the device. The controller may also receive a second unique signal from a second device that the user touches, and determine that the second unique signal is associated with the identifier of the user. Then, the controller dis-associates the user with the device, associates the user with the second device, and positions the first area to be in proximity to the second device. In some embodiments, the identifier of the user is a hand image and the device is a touch pad. The hand image may be a capacitive image, and the controller may be configured to extract features from the capacitive image that uniquely identify the user. In some embodiments, the identifier of the user comprises electrical impedance measurements at differing frequencies.

The controller may also receive a second unique signal from the device, determine that the second unique signal is not associated with the user, dis-associate the identifier of the user with the device, associate a second identifier of a second user associated with the second unique signal with the device, and position another area associated with the second user to be in proximity to the device.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIGS. 5A-5C illustrate a PCAP sensor, according to example embodiments of the disclosure.

Figure 1:
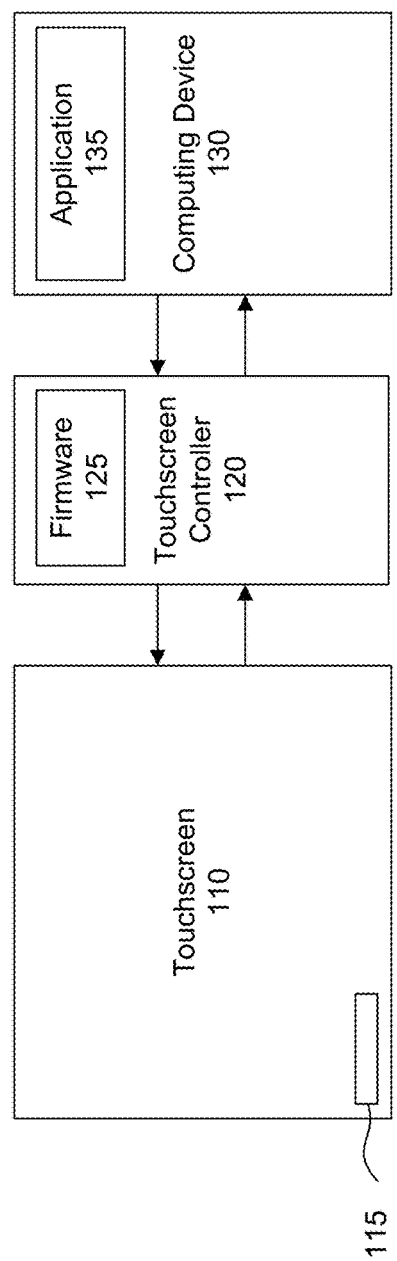
FIG. 1 illustrates a system, according to example embodiments of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

FIG. 1 is illustrates system 100 according to example embodiments of the disclosure. System 100 includes touchscreen 110, touchscreen controller 120, and computing device 130. In embodiments, touchscreen 110 may be a large scale projected capacitive (PCAP) touchscreen used as an interactive table surface. The interactive table surface may be a large gaming table, a home entertainment system, an industrial control system, a corporate boardroom communication and collaboration device, etc. In other embodiments, touchscreen 110 may be other sizes and used in other applications, and may be implemented using other touch technologies such as but not limited to acoustic pulse recognition, optical, resistive, surface acoustic wave, etc. Computing device 130 may be a host computer running software application 135 (e.g., application-level software), such as a gaming application. Software application 135 may support multiple users that interact with software application 135. Touchscreen controller 120 includes firmware 125 that communicates with software application 135 in computing device 130 via a communication protocol to support the performance characteristics of software application 135.

As an example, software application 135 may require a user to sign their name on touchscreen 110 (e.g., to complete a purchase or sign a release). However, the coordinate (x, y) report rate for a full scan on touchscreen 110 may not be sufficient to capture the user's signature, e.g., the signature appears as jumble of awkwardly connected line segments. While increasing the coordinate rate results in an acceptable signature, increasing the coordinate report rate across the entirety of touchscreen 110 to capture the signature might not be desirable or even feasible. Accordingly, in embodiments, system 100 can support a full scan across touchscreen 110 and altered touch reporting in an area that is smaller than the entire area of touchscreen 110.

The altered touch reporting area may be an area where a fast scan occurs. The coordinate report rate for the fast scan is accelerated compared to the coordinate report rate of the full scan of touchscreen 110. The area associated with the fast scan is called a fast scan area. In this example, software application 135 may transmit information that results in an image of signature capture area 115 (e.g., a small rectangle), and also transmit information to firmware 125 to designate signature capture area 115 as an altered touch reporting area that is a fast scan area. Thus, the user's signature received in signature capture area 115 on touchscreen 110, is captured at an accelerated coordinate report rate to satisfy the performance characteristics for software application 135.

In another example, system 100 can support an altered touch reporting area that may be a slow scan area (not shown) where a slow scan occurs. The coordinate report rate for the slow scan is decelerated compared to the coordinate report rate of the full scan of touchscreen 110. The area associated with the slow scan is called a slow scan area. To satisfy performance characteristics of software application 135, touchscreen 110 may include a fast scan area, a slow scan area, or a combination of one or more fast scan areas and/or one or more slow scan areas.

Embodiments include a system including a touchscreen coupled to a controller. The controller adjusts performance of the touchscreen through dynamically setting at least one controller parameter to support an altered touch reporting in at least one first area of the touchscreen compared to a second area of the touchscreen. The controller enables touch detection for the at least one first area according to performance characteristics needed for an application operating in the second area. The second area may be for example, the remaining area of the touchscreen, a central common area of the touchscreen, or a different area of the touchscreen.

Figure 2:
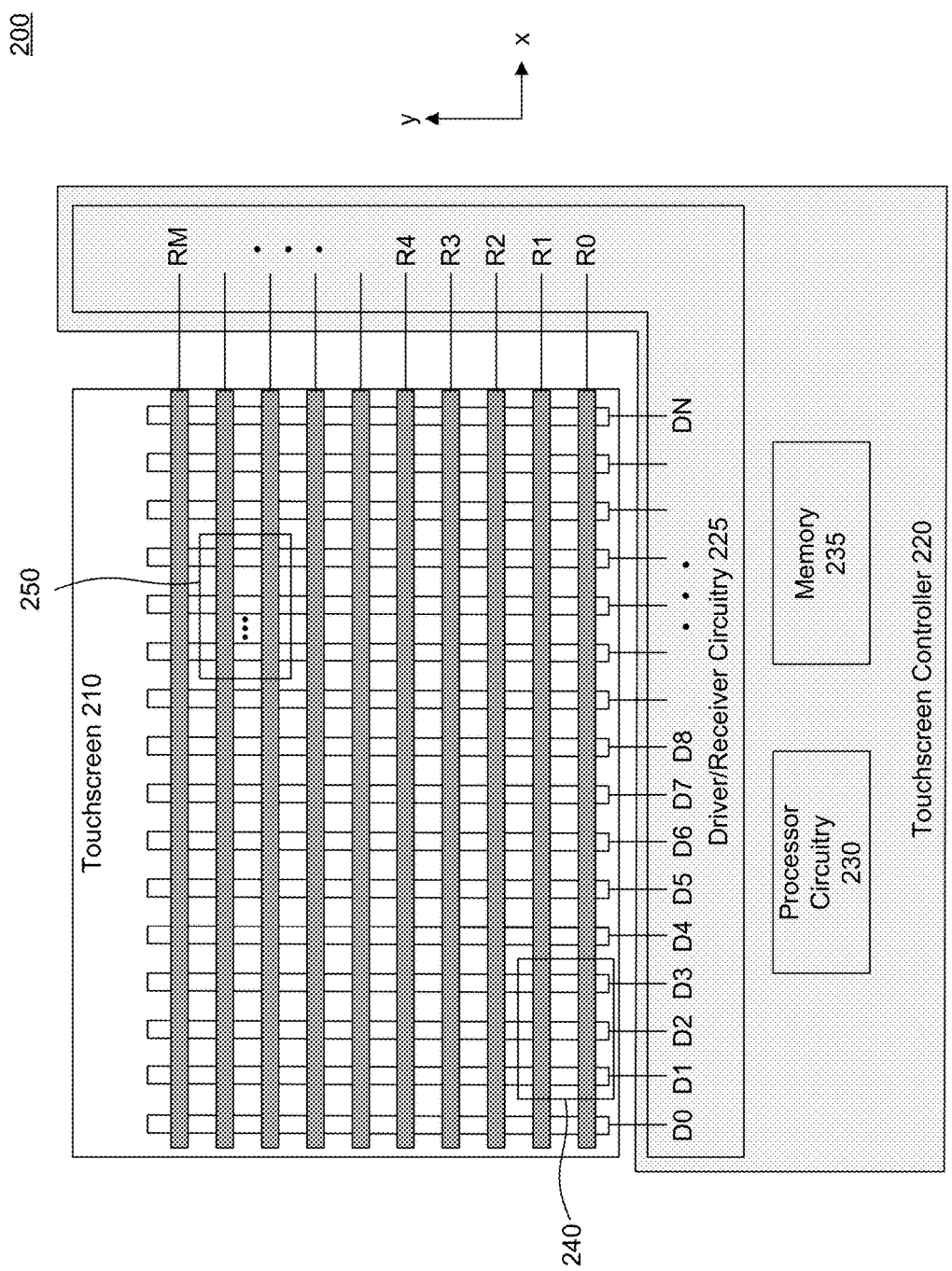
FIG. 2 illustrates details of a system, according to example embodiments of the disclosure.

FIG. 2 illustrates details of system 200, according to example embodiments of the disclosure. System 200 includes PCAP touchscreen 210 coupled to touchscreen controller 220, according to embodiments of the disclosure. In embodiments, touchscreen 210 is equivalent or generally corresponds to touchscreen 110, and touchscreen controller 220 is equivalent or generally corresponds to touchscreen controller 120. Touchscreen controller 220 includes processor circuitry 230, driver/receiver circuitry 225, and memory 235. Processor circuitry 230 includes one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access memory, an internal memory and/or external memory to retrieve instructions stored in the memory, which when executed by the processor, perform the corresponding function(s) associated with the processor.

Driver/receiver circuitry 225 may include analog-to-digital converters, flexibly programmable driver/receiver circuits, and/or filters for example. Processor circuitry 230 controls driver/receiver circuitry 225. For example, processor circuitry 230 controls the assignment of the programmable driver/receiver circuits as a driver or as a receiver, and the assignment can be determined in real time. For example, a driver/receiver circuit connected to a vertical electrode may be assigned to function as a driver in an x direction in one scan in which vertical electrodes are sequentially excited, and then be assigned to function as a receiver in a y direction in a later scan in which horizontal electrodes are sequentially excited. The ability to swap assignment between driver and receiver modes in real time allows touchscreen controller 220 to respond fluidly to satisfy the performance characteristics of software application 135 (e.g., gaming applications, painting applications, etc). Memory 235 may include stored instructions for processor circuitry 230 as well as data such as received touch signal data. Memory 235 may also be used to store baseline capacitance values measured when no touch is present; touches are recognized when live capacitance measurements differ from stored baseline values. The received touch signal data are based on electronic signals responsive to changes in capacitances associated with touchscreen 210. Memory 235 may include but is not limited to: random access memory (RAM), electrically erasable programmable read-only memory (EEPROM), or flash memory.

Touchscreen 210 includes a plurality of horizontal electrodes and a plurality of vertical electrodes coupled to flexibly programmable driver/receiver circuitry of driver/receiver circuitry 225. Processor circuitry 230 controls the assignment of the programmable driver/receiver circuits in real time. The portions of driver/receiver circuitry 225 connected to vertical electrodes may be set to function as a drivers and other portions of driver/receive circuitry 225 may be set to function as receivers; subsequently, processor circuitry 230 may change the assignments so that circuitry connected to the vertical electrodes functions as receivers and circuitry connected to horizontal electrodes functions as drivers. To illustrate a non-limiting example, the vertical electrodes (white lines in FIG. 2) are coupled to flexibly programmable driver/receiver circuits programmed as driver lines D0-DN, and the horizontal electrodes (shaded lines in FIG. 2) are coupled to flexibly programmable driver/receiver circuits programmed as receiver lines R0-RM. Vertical electrodes (white lines) as well as horizontal electrodes (shaded lines) may include indium tin oxide (ITO) media or metal mesh media. Further, the individual receiver circuits may be programmed to receive data in parallel from R0-RM, receive data from a subset of receiver lines R0-RM, or combinations thereof. The programming of the driver/receiver circuits may be changed in real time, for example, so that driver/receive circuits coupled to the vertical electrodes (white lines) become receivers and the driver/receiver circuits coupled to horizontal electrodes (shaded lines) become drivers. In addition to the assignment of the programmable driver/receiver circuits as drivers or receivers, processor circuitry 230 controls the number of cycles per driver, the driver cycle rate, and the scan repetition rate across touchscreen 210. For example, the number of cycles per driver might be fifty, the driver cycle rate or driver frequency may be 500 kHz or 2 μsec per cycle and hence 100 μsec for fifty cycles; a full scan over 200 sequentially driven (e.g., activated) electrodes a total scan time of 20 msec or 50 Hz total scan repetition rate (the inequalities become equalities if one neglects channel switching times or other overheads).

Touchscreen controller 220 supports a full scan of touchscreen 210 and altered touch reporting in at least one first area to satisfy performance characteristics of displayed applications. During a full scan, processor circuitry 230 activates or drives one driver line at a time, while the remaining vertical driver lines are connected to ground. Receiver lines R0 through RM may be active and receive touch signal data in parallel. For example, at the command of processor circuitry 230, driver/receiver circuitry 225 transmits digital pulses to the line labeled D0 in FIG. 2, while the remaining vertical electrodes connected to lines D1-DN that are inactive, e.g., connected to ground or another constant idle voltage. Processor circuitry 230 then transmits digital pulses to the electrode connected to line D1 while the remaining vertical electrodes remain inactive, and so on. When line D1 is driven and a user touches a point on touchscreen 210 in the vicinity an the intersection of the electrode connected to D1 and an electrode connected to circuitry in receiver mode (e.g., a shaded line), a touch signal may be detected and received at the respective receiver circuit of driver/receiver circuitry 225. The touch signal may be a change in current signal or integrated charge associated with a reduction in capacitance between the electrode connected to line D1 line and the respective horizontal electrode when the user touches that location on touchscreen 210. Touch signals are received and processed to detect and track a touch location across touchscreen 210. The touch locations may be saved in memory 235 and/or transmitted to software application 135 of computing device 130.

In some embodiments, it may be desirable to include low-resolution scans of touch activity in which neighboring groups (e.g. pairs, triples) of electrodes are driven simultaneously.

The at least one first area that supports altered touch reporting may be a fast scan area. To support a fast scan on touchscreen 210, processor circuitry 230 continues the full scan across touchscreen 210 as described above, sequentially activating (e.g., driving or exciting) lines D0-DN. However, as dictated by application software 135 performance characteristics, processor circuitry 230 temporarily halts the full scan at a respective location (e.g., stops the sequential activation at line D49) to perform a scan across fast scan area 240 (e.g., sequentially activates lines D1-D3), then resumes the full scan at the respective location (e.g., sequentially activates line D50 and so on). Halting the full scan, scanning the fast scan area, and resuming the full scan occurs accordingly satisfies the performance characteristics of software application 135. Note that FIG. 2 is not drawn to scale and a fast scan area, for example, could include a larger number of intersections between driven lines and receiver lines.

In an example, software application 135 transmits information to firmware 125 regarding needed performance characteristics. Accordingly, touchscreen controller 220 determines that a full scan should be ≤30 msec; in other words, the full scan rate criteria is ≥33.3 Hz. Touchscreen controller 220 programs driver/receiver circuitry 225 to drive or excite 200 lines D0-D199 with each driven line active for approximately 100 μsec. Touchscreen controller 220 also programs driver/receiver circuitry 225 to receive in parallel signals from 140 horizontal electrodes connected to lines R0-R139. Touchscreen controller 220 also supports fast scan area 250 that overlaps vertical electrodes connected to lines D120-D129, and determines that a desired fast scan should be ≤10 msec; in other words, the fast scan rate criteria is ≥100 Hz).

Touchscreen controller 220 activates lines sequentially beginning with line D0 with the remaining lines D1-D199 inactive (e.g., grounded), then activates line D1 with the remaining lines D0 and D2-D199 inactive, and so on. Accordingly, in an embodiment, a full scan across touchscreen 210 from D0-D199 without any fast scans takes approximately 20 msec (200 driven lines×100 μsec). The full scan rate criteria of ≤30 msec is satisfied.

In one example, when fast scan area 250 is included, touchscreen controller 220 completes a portion of the full scan (e.g., a quarter of the full scan), completes a fast scan, and then returns to continue another portion (e.g., another quarter) of the full scan. This is repeated accordingly to satisfy the performance characteristics of software application 135. For example, touchscreen controller 220 completes a first quarter of a full scan starting with line D0 and stopping after line D49 which takes 5 msec (50 driven lines×100 µsec). Touchscreen controller 220 then completes a fast scan of fast scan area 250 by sequentially activating lines D120-129 one at a time, while keeping the remaining vertical electrodes inactive which takes 1 msec (10 driven lines×100 µsec). Touchscreen controller then returns to compete a second quarter of the full scan starting with line D50 and stopping after line D99 which takes 5 msec. Touchscreen controller 220 then completes another scan of fast scan area 250 by sequentially activating lines D120-129 one at a time, while keeping the remaining vertical electrodes grounded which takes 1 msec. Touchscreen controller then returns to compete a third quarter of the full scan starting with line D100 and stopping after line D149 which takes 5 msec. Touchscreen controller 220 then completes another scan of fast scan area 250 which takes 1 msec. Touchscreen controller then returns to compete a fourth quarter of the full scan starting with line D150 and stopping after line D199 which takes 5 msec. Touchscreen controller 220 then completes another scan of fast scan area 250 which takes 1 msec. Thus, for a full scan that included four scans of fast scan area 250 takes 24 msec (5 msec from each quarter of the full scan×4 quarters+1 msec from each fast scan×4 fast scans) which satisfies the full scan rate criteria of ≤30 msec. In addition, the fast scans are repeated every 6 msec (5 msec for a quarter of the full scan plus 1 msec for a scan of the fast-scan area) which satisfies the fast scan rate criteria of ≤10 msec.

In this example, the receiver lines are read in parallel. In another example, the number of active individual receiver circuits can be restricted to reduce the amount of touch signal information received and therefore, the amount of touch signal information to be processed.

Figure 3:
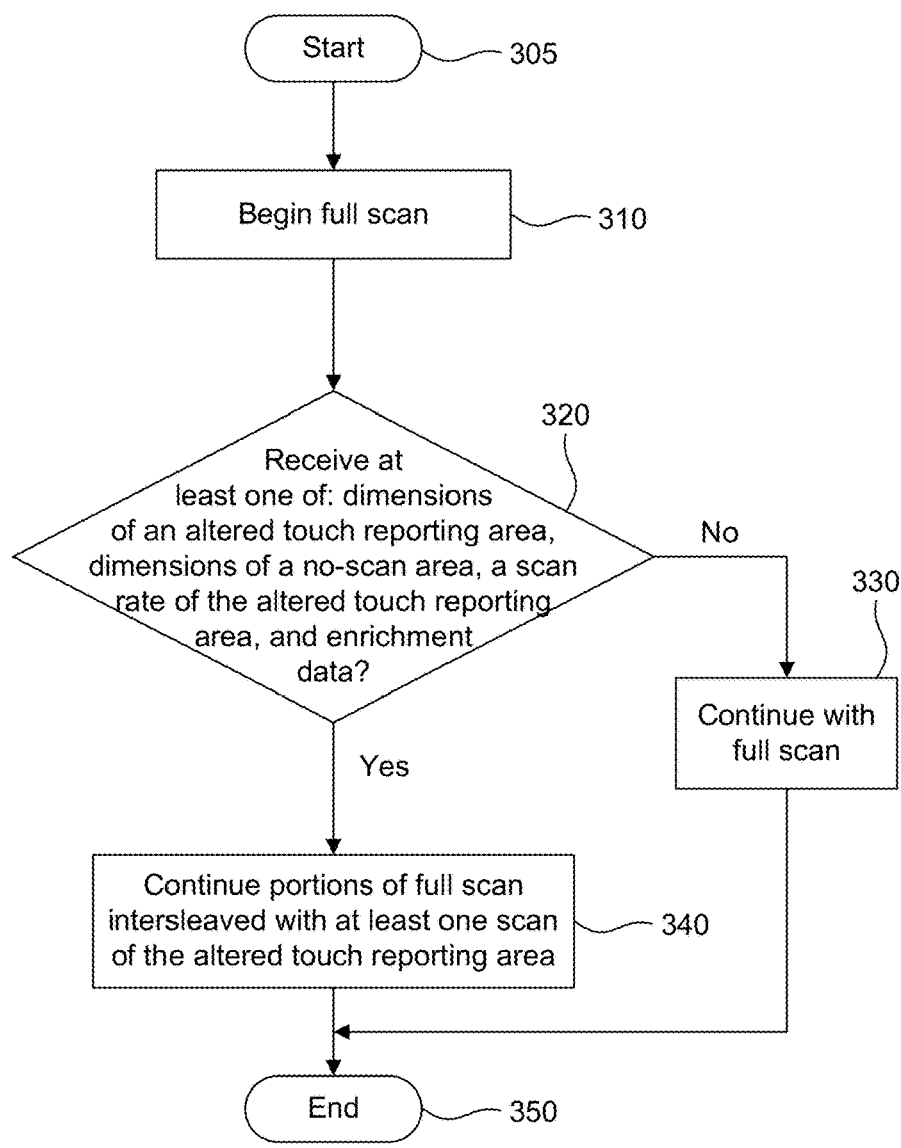
FIG. 3 illustrates a flow chart of a method, according to an embodiment of the disclosure.

FIG. 3 illustrates a flow chart of method 300 according to an embodiment of the disclosure. Method 300 may be performed by system 100 shown in FIG. 1 and/or system 200 in FIG. 2, in accordance with an example of the present disclosure. It is to be appreciated not all steps may be needed to perform disclosure provided herein. Further, some of the steps may be performed simultaneously, or in a different order than that shown in FIG. 3, as will be understood by those skilled in the art.

At step 305, method 300 begins and proceeds to step 310.

At step 310, touchscreen controller 220 begins a full scan of touchscreen 210. Method 300 proceeds to step 320.

At step 320, a determination is made whether touchscreen controller 120 (e.g., firmware 125) has received information from computing device 130 to support performance characteristics of software application 135 on large scale PCAP touchscreen 210. For example, software application 135 may communicate with firmware 125 to exchange data and/or instructions regarding altered touch reporting parameters that may be stored in memory 235. In an embodiment, touchscreen controller 120 receives at least one of the following altered touch reporting parameters: dimensions of an altered touch reporting area, dimensions of a no-scan area, a scan rate of the altered touch reporting area, and enrichment data. Touchscreen controller 120 may also receive a scan rate of the full scan area.

Dimensions of an altered touch reporting area may include the shape of the altered touch reporting area, the dimensions that define the shape (e.g., square, rectangle, circle, etc.), and an offset location on touchscreen 110 from which the altered touch reporting area is located. For example, the altered touch reporting area may be a static location on a touchscreen, or a dynamic location on a touchscreen with regards to a detected touch. A no-scan area is an area where touch signals are ignored. For example, touch signals received from a no-scan area may be discarded. Dimensions of a no-scan area may include a shape and an offset location on touchscreen 110. The offset location may be in relation to an altered touch reporting area.

Software application 135 may request reporting of additional (enrichment) data for touches in an altered touch reporting area as well as other areas of touchscreen 110 during a full scan. Standard touch reports from firmware 125 to the software application contain (x,y) coordinates of a touch detected. Enrichment data may include a z coordinate (e.g., equal to sum of all pixel touch signals associated with a touch), touch size (e.g., equal to the number of pixels with touch signals, where an unusually large number may be indicative of an elbow, heel of a palm), touch shape (e.g., a palm), touch orientation (angle of major axis of pattern of touched pixels with respect to the X axis, perhaps indicative of a rotation of an elliptical finger-touch contact area), or even a collection of touch signal data for all touch pixels in a region including the touch. The z-coordinate may be used to detect touch pressure or touch strength. Enrichment data may also include capacitive signal data at locations corresponding to the X coordinate of one touch and the Y coordinate of another touch, or a processed and reduced version of such data sufficient to determine if the two touches are from the same or different users. U.S. patent application Ser. No. 14/322,605, entitled Multi-user Multi-touch Projected Capacitance Touch Sensor, which is incorporated herein by reference in its entirety, describes the nature and uses of anti-ghost information from PCAP touchscreens. Furthermore, enrichment data can include any information resulting from anything affecting electric fields in the vicinity of the touchscreen in such a way as to affect measurements of controller 120. Software application 135 may request that firmware 125 transmit more enrichment data, less enrichment data, or no enrichment data to support performance characteristics.

When touches are detected on touchscreen 210, corresponding touch signal data is received at a receiver circuit(s) and analyzed by touchscreen controller 220 to detect (x,y) coordinates of the touch location. This coordinate information is then transmitted back to software application 135 on computing device 130. Software application 135 may also request enrichment data in addition to the (x,y) coordinate information. For example, software application 135 may request z-coordinate data that may include touch pressure or strength applied to the touch location. When enrichment data is specified, touchscreen controller 220 provides additional information in addition to the (x,y) coordinate information.

When at least one of the altered touch reporting parameters is received, method 300 continues to step 340. When none of the altered touch reporting parameters is received, method 300 continues to step 330.

At step 340, touchscreen controller completes portions of a full scan interspersed with at least one altered touch reporting area, repeating accordingly to satisfy the performance characteristics of software application 135. Method 300 proceeds to step 350 and ends.

In an embodiment where the touchscreen includes a plurality of driven lines, the touchscreen controller is further configured to activate at least one driven line of the plurality of driven lines at a time; and determine, in real time, the at least one driven line to activate. In another embodiment, the controller parameter comprises: a subset of driven lines of the plurality of driven lines associated with the at least one first area, wherein the at least one first area is smaller than the second area.

Returning to step 330, when none of the altered touch reporting parameters is received, method touchscreen controller 220 continues the full scan of touchscreen 210. Method 300 proceeds to step 350 and ends. Although method 300 ends, method 300 is typically repeated as long as a touchscreen response to touches is desired (e.g., to satisfy performance characteristics of software application 135.)

Figure 4A:
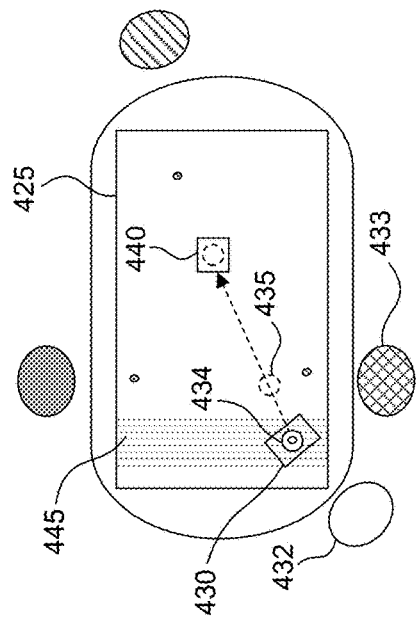
FIGS. 4A-4C illustrate examples of one or more fast scan areas, according to embodiments of the disclosure.
Figure 4B:
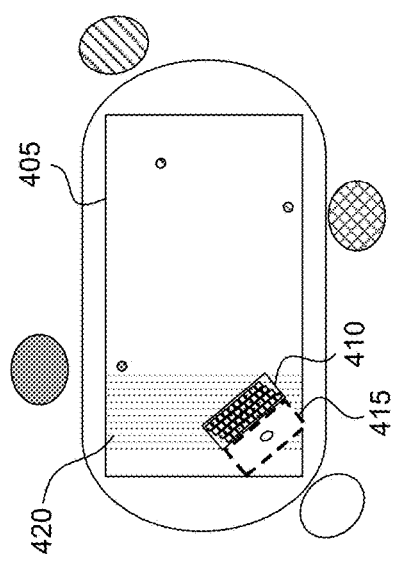
Figure 4C:
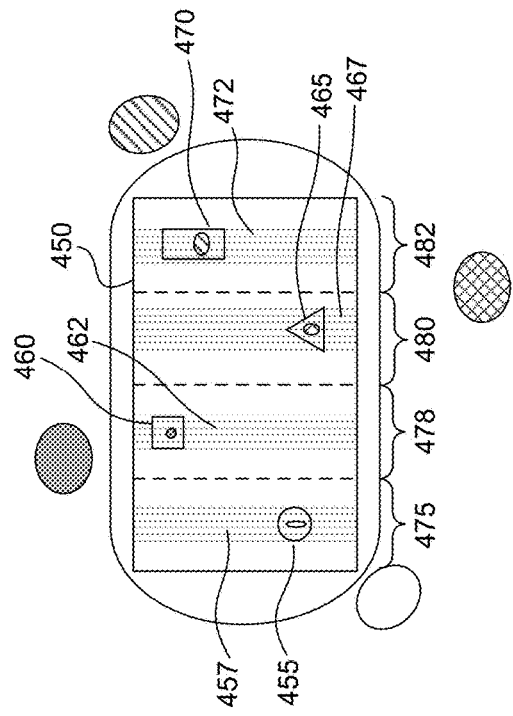

FIGS. 4A-4C illustrate embodiments of one or more altered touch reporting areas of a touchscreen. The embodiments may be described with regards to elements of systems 100 and/or system 200, for example. In FIGS. 4A-4C, the altered touch reporting areas may be fast scan areas. FIG. 4A illustrates a virtual keyboard 410 on a large PCAP touchscreen 405, with no-scan area 415. The four large ovals indicate four users interacting with touchscreen 405. Three of the four small circles on touchscreen 405 may be touches of the three users without a keyboard image. Touchscreen 405 is equivalent or generally corresponds to touchscreen 210. As an example, software application 135 may send a virtual keyboard image 410 to be displayed on a display behind touchscreen 405, and also designate an associated fast scan area to the touchscreen controller firmware 125. For example, the software application may communicate with the touchscreen controller firmware via a communication protocol to indicate the dimensions of virtual keyboard image 410, an offset location (e.g., (x,y) coordinates) on touchscreen 405 to place virtual keyboard image 410 on touchscreen 405, and treat the virtual keyboard area as a fast scan area. Virtual keyboard image 410 on large touch screen 405 allows a user to enter or edit text. The user may rest their palms or the heel of their palms on touchscreen 405 but that would generate false touches while typing on the virtual keyboard. Accordingly, the software application also indicates the dimensions and offset location for no-scan area 415 as being adjacent and below virtual keyboard image 410 to the touchscreen controller firmware that disables touch-detection on no-scan area 415 in real time.

When using a virtual keyboard, a user may rest all fingers on virtual keyboard image 410 when typing, but only one finger performs the actual key-stroke at a time. This may be difficult to accomplish with virtual keyboard on a touchscreen. The software application can use the time/duration that each finger touches and stays on the screen (e.g., on a virtual key of the keyboard) along with finger touch strength or pressure data (e.g., z coordinate data) to determine if a finger touch is a "keyboard key-stroke" thus eliminating the "fingers resting on virtual keyboard image 410" as keyboard key-strokes. In an embodiment, software application 135 may also request enrichment data such as z-coordinate data. Accordingly, touchscreen controller firmware 125 causes processor circuitry 230 to activate driver/receiver circuitry 225 accordingly to collect and report touch coordinates (x, y, z) to software application 135 over a period of time, wherein the software application recognizes potential keyboard key-stroke touches while eliminating touches from fingers resting on virtual keyboard image 410.

For example, the software application can define a minimum time and a maximum time that a finger touches the screen. When the time a finger touches the screen is below the minimum time, the touch is interpreted as an unintended touch. And when the time a finger touches the screen exceeds the maximum time, the touch is interpreted as a finger resting on the virtual keyboard. Furthermore, the software application can use the z-coordinate data (touch strength data) to qualify a valid key-stroke. Note that subset of driver lines 420 support fast scan area 410. Touch signal data collected with regards to no-scan area 415 may be discarded to reduce processing and/or to produce more accurate touch location data.

FIG. 4B illustrates an out-of-reach touch control on a large PCAP touchscreen. Dragging a virtual object 434 from one location within fast scan area 430 to another location 440 on a large multi-user touch/display table becomes difficult when, for example, the destination location is either physically out of reach of the user and/or blocked by the proximity of another user. In FIG. 4B, user 432 desires to move a virtual object 434 within fast scan area 430, to a location 440 beyond user 432's reach. For example, user 432 may be placing a virtual betting chip from the user's fast scan zone 430 to a desired but remote location 440 of a virtual roulette table, pushing a virtual shuffle board tile pushed across a virtual shuffle board, kicking a virtual ball across a virtual field, etc. User 433's proximity makes it difficult for user 432 to reach desired location 440. In this scenario, user 432 may control the trajectory of the virtual object 434 by using repetitive touch strokes within fast scan area 430 to guide and adjust the trajectory of virtual object 434 toward location 440. In another example, the user may use a flick touch of the virtual object within fast scan area 430 in the direction of desired location 440 as shown by the dashed arrow and the progression image 435. User 432 could use a second finger touch in fast scan area 430 to stop the virtual object. User 432 could repeat the flick/stop touch and/or the repetitive stroke touch in fast scan area 430 until the virtual object reached desired location 440. To support the flick/stop touch, z-coordinate information enrichment data may be detected, processed, and transmitted to software application 135. Subset of driver lines 445 support fast scan area 430. Note that in these examples, a virtual object may be outside of a fast scan area 430 and yet be controlled from fast scan area 430.

FIG. 4C illustrates a large PCAP touchscreen 450 with four fast scan areas: 455, 460, 465, and 470. In this example, there may be multiple users with different dimensions of fast scan areas, each fast scan area may operate at a different or same scan rate as another fast scan area, and a fast scan area may be static on touchscreen 450 or dynamic. A dynamic fast scan area moves on touchscreen 450 at an offset coordinate determined from a detected touch location. Note that the drawings are not to scale and fast scan areas are smaller compared to the entire touchscreen area 450.

A fast scan area may be the same or different shape as another fast scan area, or may be the same or different size than another fast scan area. In addition, a fast scan area may operate at the same or at a different scan rate than another fast scan area. For example, the four fast scan areas 455, 460, 465, and 470 are supported respectively by driver line subsets 457, 462, 467, and 472. As an example, fast scan areas 455 and 465 may have a faster scan rate than scan areas 460 and 470 and system touch controller 220 may activate subsets of drivers as follows:

$1^{st}$ quarter subset of drivers 475 of a full scan, driver subsets: 457, 467, 462, 472;

$2^{nd}$ quarter subset of drivers 478 of the full scan, driver subsets: 457, 467;

$3^{rd}$ quarter of subset drivers 480 of the full scan, driver subsets: 457, 467, 462, 472; and $4^{th}$ quarter of subset drivers 482 of the full scan, driver subsets: 457, 467.

Note that driver subsets 462 and 472 may be occasionally skipped (e.g., not activated) so their respective fast scan areas 460 and 470 are not scanned as often. The pattern may be dynamically repeated or changed based on performance characteristics of software application 135 as well as characteristics of users and/or the application. For example, a beginner painter (e.g., finger painting, or a young child learning to paint), could be using fast scan areas 460 and 470 and do not need as much data capture compared to an advanced painter who is painting quickly (e.g., Asian calligraphy strokes with a special paint brush tip) who could be using fast scan areas 455 or 465. In another example, fast scan area 455 may be at the fastest scan rate while the remaining fast scan areas 460, 465, and 470 occur at a slower scan rate. Or, there may be four different fast scan rates. In an embodiment there may be only fast scan areas and no full scan areas (e.g., at the start of a game when players are registering). Note that a wide variety of combinations are possible, as long as the fast scan rate criteria and the full scan rate criteria are satisfied to meet the performance characteristics of software application 135. Also note that not all full scans may insert a fast scan every quarter of a touchscreen. The portion of a touchscreen that is activated before inserting a scan of a fast scan area is variable and programmable.

In another embodiment, an altered touch reporting area may be static. In another embodiment, an altered touch reporting area that is a fast scan area may be dynamic. When multiple altered touch reporting areas are present, some or all of the altered touch reporting areas may be static, dynamic, or a combination thereof. A static altered touch reporting area is fixed at a location on touchscreen 450, (e.g., a signature capture area). A dynamic fast scan area moves in relation to a previously detected touch location. For example, scan area 460 may move in relation to a finger painting touch detected in the center of scan area 460. As the (x,y) coordinate of the finger painting touch is determined, the square fast scan area 460 may be adjusted accordingly so that the (x,y) coordinate is the center of the square fast scan area 460. Thus, subset of drivers 462 may be adjusted to remove some drivers and add some drivers to accommodate the shift of fast scan area 460. In an example, dynamic fast scan areas may have a faster scan rate than static fast scan areas. The fast scan area requested by software application 135 may be a subset of the fast scan area actually implemented by touchscreen controller 120 in firmware 125. Hardware and firmware constraints on a fast scan area geometry may be known and taken into account at the firmware level.

In another embodiment, a fast scan area may be user defined. For example, a user may draw a rectangle with a finger to indicate the desired size and location of a fast scan area. This may be in the context of appropriate communication between software application 135 and the user via displayed instructions or images. After the user has drawn a rectangle, software application software 135 may then respond to this input by sending firmware 125 instructions to initiate the desired fast scan area.

After software application 135 has communicated at least one of: dimensions of an altered touch reporting area, scan rate for the altered touch reporting area, dimensions of a no-scan area, and enrichment data to firmware 125, firmware 125 may report touch information accordingly until new instructions are received.

In an embodiment, the at least one first area is static on the touchscreen. In another embodiment, the at least one first area is a fast scan area; further, the at least one first area is dynamic on the touchscreen, and moves according to a detected touch location.

As mentioned earlier, enrichment data comprise additional data collected with a detected touch signal that may be processed and/or transmitted to a software application 135.

Examples of enrichment data may also include changes in capacitances detected on touchscreen 110 that are not due to finger touches. The area for which enrichment data is generated, called an enrichment data area, may correspond to an altered touch reporting area such as a fast scan area of touchscreen 110 or a slow scan area of touchscreen 110. In addition, an enrichment data area may be an area of touchscreen 110 during a full scan. for example, software application 135 may communicate with firmware 125 to exchange data and/or instructions regarding at least one of the following enrichment data area parameters that may be stored in memory 235: dimensions of an enrichment data area, a location on touchscreen 110, and a type of enrichment data. Touchscreen 110 may include one or more enrichment data areas that may detect changes in measured capacitances that can be indicative of a change in weight, pressure, or a change in temperature.

FIGS. 5A-5C illustrate a PCAP accessory 525, according to example embodiments of the disclosure. The embodiments may be described with regards to elements of systems 100 and/or system 200. In FIGS. 5B and 5C, an enrichment data area may be a slow scan area or an area of touchscreen 110 during a full scan. FIG. 5A illustrates a PCAP accessory 525 that may be a coaster used on a horizontally oriented touchscreen to indicate whether a beverage has been consumed and/or has changed temperature and thus, the consumer of the beverage may desire another drink, for example. PCAP accessory 525 may be used on touchscreen 210 and in particular, on an enrichment data area of touchscreen 210. PCAP sensor 510 may include pressure sensor spring 520, temperature sensor 510, and/or transmitter 515. Pressure sensor spring 520 expands (e.g., becomes taller) or compresses (e.g., becomes shorter) based on a sensed change in pressure or weight. The changes in the height of pressure sensor spring 520 causes a change in the electric fields associated with PCAP accessory 525 that may be sensed by touchscreen 210 or an enriched data area of touchscreen 210 on which PCAP accessory 525 is located.

Temperature sensor 510 may be a bimetal sensor that includes two metals bonded together with different coefficients of expansion. At room temperature, the metals such as copper and iron are parallel or flat. When exposed to higher temperatures, however, one metal expands causing the metal strip to bend. Thus, when exposed to heat, the bimetal strip of temperature sensor 510 bends and causes a change in the electric fields associated with PCAP accessory 525 compared to the electric fields associated with PCAP accessory 525 at room temperature. If PCAP accessory 525 is located on touchscreen 210 and/or an enriched data area of touchscreen 210, the change in the electric fields associated with PCAP accessory 525 can be detected. Alternatively, temperature sensor 510 might not produce effects that can be directly measured by the touchscreen system and instead temperature information may be communicated indirectly through a transmitter 515. For example, transmitter 515 itself may alter electric field patterns in a way that is detectable by touchscreen 210 and/or an enriched data area of touchscreen 210. Transmitter 515 may transmit a different electric field pattern based on changes detected by pressure sensor spring 520 and/or temperature sensor 510. Transmitter 515 is an optional feature of PCAP sensor 510, and PCAP sensor may operate without a power source (e.g., batteries).

FIG. 5B illustrates container and contents 535 (e.g., a mug containing a beverage) placed on PCAP accessory 525a (depicted as a pressure sensor spring) placed on touchscreen 530 and/or an enriched data area of touchscreen 530. Touchscreen 530 is equivalent to touchscreen 210. PCAP accessory 525a responds to the weight of container and contents 535 and the pressure sensor spring within PCAP accessory 525a compresses. Touchscreen 530 and/or a enriched data area of touchscreen 530, detects the electric field associated with PCAP accessory 525a. A touchscreen controller (e.g., equivalent to touchscreen controller 220) receives corresponding signals and may determine that container and contents 535 is full. In addition or alternatively, transmitter 515 may transmit a first electric field signal that may be detected by touchscreen 530 and/or a enriched data area of touchscreen 530 to indicate that container and contents 535 is full.

When the weight of container and contents changes (e.g., is reduced) as shown by container and contents 545, the pressure sensor spring in PCAP accessory 525b (which is depicted as a pressure sensor spring) detects the change and may expand to raise the height of the pressure sensor spring. Accordingly, touchscreen 530 and/or an enriched data area of touchscreen 530, detects the change in the electric field associated with PCAP accessory 525b due to the change in the height of the pressure sensor spring. The corresponding touchscreen controller receives corresponding signals and determines that container and contents 545 is empty. In addition or alternatively, transmitter 515 may transmit a second electric field signal that may be detected by touchscreen 530 and/or an enriched data area of touchscreen 530 indicating the change in sensed pressure or weight. The second electric field signal may be detected on touchscreen 530 and/or an enriched data area of touchscreen 530, and received, processed, and transmitted by touchscreen controller 210 to an application software that manages hospitality, for example, to indicate that a user's beverage is reduced and/or the user may desire another beverage or refill.

In another example, hot container and contents 565 is placed on PCAP accessory 525d on touchscreen 550 which is equivalent to touchscreen 210. PCAP accessory 525d includes temperature sensor 510 that detects the temperature of hot container and contents 565 resulting in a bending of the bimetal strip that affects the electric field of PCAP accessory 525d detected on touchscreen 550 and/or an enrichment data area of touchscreen 550. In addition or alternatively, transmitter 515 of PCAP accessory 525d may transmit an electric field signal corresponding with the detected temperature. Touchscreen 550 and/or an enriched data area of touchscreen 550 detects the electric field signal and transmits the information to a corresponding touchscreen controller for processing.

Over time a container of hot beverages cools down and/or is consumed. Accordingly, container and contents 555 is a cooled version of hot container and contents 565. PCAP accessory 525c detects the change in temperature via temperature sensor 510 (e.g., the bimetal strip becomes flat) and the electric field of PCAP accessory 525c changes accordingly. In addition or alternatively, transmitter 515 transmits a second electric field signal that may be detected on touchscreen 550 and/or an enriched data area of touchscreen 550. The change in the electric field signal and/or signals are received, processed, and transmitted by the touchscreen controller to an application software that manages hospitality, for example, to indicate that a user's beverage is in need attention, and/or the user may desire another beverage or refill.

In an embodiment, the at least one first area is a slow scan area. In another embodiment, the system includes a sensor in contact with the at least one first area, wherein the sensor is configured to: detect changes in at least one of: temperature, pressure, or weight; and adjust an electric field of the sensor accordingly; and the controller further configured to: detect the electric field adjustment. In an embodiment, the sensor comprises: a metal strip comprising at least two metals with different coefficients of expansion, wherein a shape of the metal strip alters according to a change in temperature. In embodiment, the sensor comprises: a spring whose height changes with a change in pressure or weight.

Figure 6A:
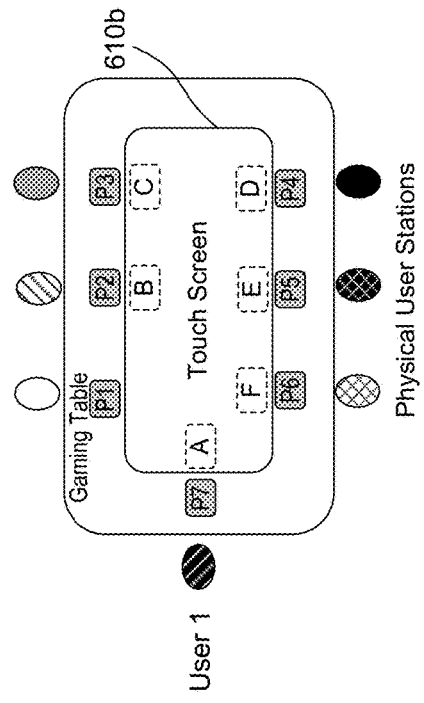
FIGS. 6A-6D illustrate examples of multiple users on a large interactive PCAP touchscreen, according to example embodiments of the disclosure.

FIGS. 6A-6D illustrate examples of multiple users on a large interactive PCAP touchscreen, according to example embodiments of the disclosure. The embodiments may be described with regards to elements of systems 100 and/or system 200. FIG. 6A illustrates a touchscreen gaming table with seven touch pads P1-P7. The touch pads P1-P7 are used to uniquely and securely identify each user of a multiple user interactive application on touchscreen 610a which is equivalent to touchscreen 210. Each touch pad P1-P7 is associated with a unique signal (e.g., an electrical signal) and when a user touches a touch pad, the touch pad captures a two dimensional signal or an image of the user's hand and associates that captured hand image with that user and that unique signal. A touch pad also transfers the unique signal to the user's hand.

In an example, the captured two dimensional signal or image of the user's hand is a representation of a capacitance signal, (e.g., a capacitive image). The touch pad may be a touchscreen that captures the capacitance image of the user's hand. Once captured, the capacitance image may be analyzed, for example by touchscreen controller 220, to extract key features for uniquely identifying the hand and thus, the user. Alternatively, a capacitive image of the user's hand may be captured and analyzed by dedicated electronics (not shown) in communication with application 135.

In another example, a touch pad includes a camera that captures the image of the user's hand. The captured hand image may be analyzed by touchscreen controller 220 to extract key features for uniquely identifying the hand. Other techniques, such as probing the electrical properties of the user via measuring the electrical impedance associated with a hand touch at several frequencies, may also be applied to help identify a user among multiusers on a large PCAP touchscreen.

When User 1 places a hand on touch pad P1 and the hand image is captured, touchscreen controller 220 receives the hand image. Touchscreen controller 220 associates User 1's captured hand image with the unique signal associated with touch pad P1. When User 1 touches touch pad P1 with one hand and then touches touchscreen 610a with the other hand, the unique signal is combined with the touch signal detected on touchscreen 610a and the combined signal is called a watermarked touch signal. The watermarked touch signal is received by touchscreen controller 220. The unique signal does not interfere with the touch signal detected in creating the watermarked touch signal. Touchscreen controller 220 can analyze the received watermarked touch signal to uniquely identify User 1 and determine the touch location associated with the touch on touchscreen 610a.

The unique signal is predefined and may be associated with a frequency that matches the drive frequency (e.g., bandwidth) of excitation signals (e.g., activation signals) from driver/receiver circuitry 225. This frequency or bandwidth matching enables the unique signal to be applied with very low voltage levels (e.g., in the mV range) and still be clearly detectable to receiver circuits of driver/receiver circuitry 225. Touchscreen controller 220 may optionally vary the driver frequency of excitation signals, and hence the frequency of the unique signals that it responds to. Examples of unique signal types follow: 1) Tuned to one of several possible drive frequencies of touchscreen controller 220; 2) Tuned to one driver frequency of the touchscreen controller with a code; 3) Varied carrier frequency as in item 1, and modulated with a code as in item 2. In both types 2) and 3) the unique code may be an orthogonal code.

1) Tuned to One of Several Possible Drive Frequencies of Touchscreen Controller 220:

Each touch pad P1-P7 is matched to a different driver frequency within the operating range of driver frequencies of touchscreen controller 220. Touchscreen controller 220 varies its drive frequency and each driver frequency matches at most one frequency of a unique signal of a touch pad. For example, touch pad P1's unique signal frequency might be 400 kHz, touch pad P2's unique signal frequency is 450 kHz, etc. so that touchscreen controller 220 may identify all touches due to the user at touch pad P1 by setting the driver frequency to 400 kHz, identify touches due to the user at touch pad P2 by setting drive frequency to 450 kHz, and so on. Accordingly, touch pad P1 (and hence User 1) may be associated with an electrical signal at a frequency of 400 kHz, touch pad P2 (a second user) may be associated with an electrical signal at 450 kHz, and so on to uniquely identify each user.

2) Tuned to One Driver Frequency of the Touchscreen Controller with a Code:

Touchscreen controller 220 may use an unvarying driver frequency of 500 kHz. In this case, each touch pad P1-P7 (and hence user) is assigned a different base code that is unique such as a combination of ones and zeros. Each base code is transmitted with the same carrier frequency of 500 kHz matched to the drive frequency of touchscreen controller 220. Accordingly, touchscreen controller 220 can identify a user based on the one operating frequency and the user's unique base code.

3) Varied Carrier Frequency as in Item 1, and Modulated with a Code as in Item 2. In this case, each touch pad P1-P7 (and hence user) is assigned a carrier frequency matched to a possible driver frequency as well as a code built from a combination of ones and zeros. The carrier frequency and/or the driver frequency are not necessarily unique, but, the combination of a carrier frequency and a code is unique for each touch pad P1-P7. Accordingly, touchscreen controller 220 can identify a user by scanning drive frequencies and determining the user's base code.

The set of codes in 2) and 3) above may be orthogonal sets of codes. The above examples for creating unique codes are not limiting and may be combined together or with other approaches. Appropriate sets of unique codes may be engineered to comply with the constraints on total scan time, driving frequencies etc. In many cases it may be desirable to device a code that is sufficiently time efficient so that it can be retransmitted frequently so that tests of consistent reception of a code can be used to assure reliability of user identification.

In an embodiment, the code signal is associated with an operating frequency of the controller. In another embodiment, the unique code signal is associated with one frequency of an operating pass band frequency of the controller, wherein a second unique code signal is associated with a different frequency of the operating pass band frequency of the controller. In an embodiment, the unique code signal includes a unique base code modulated to the one frequency, and the unique code signal is a low voltage signal. In an embodiment, the unique code signal is an orthogonal code. In an alternative embodiment, the unique code signal is based on a spread spectrum technique across an operating frequency range of touchscreen controller 220.

Figure 6B:
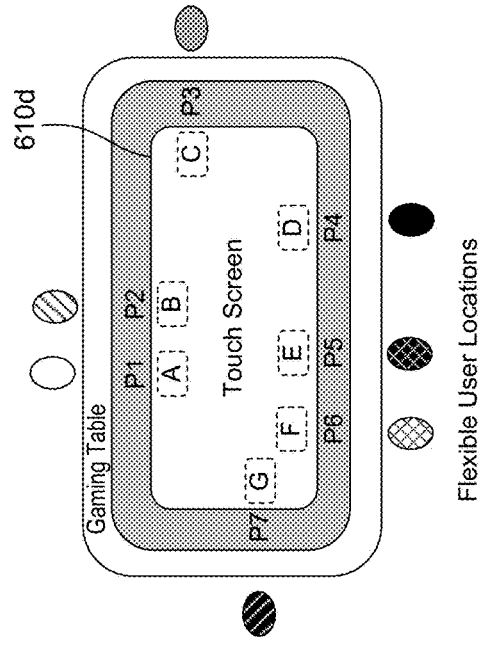
Figure 7:
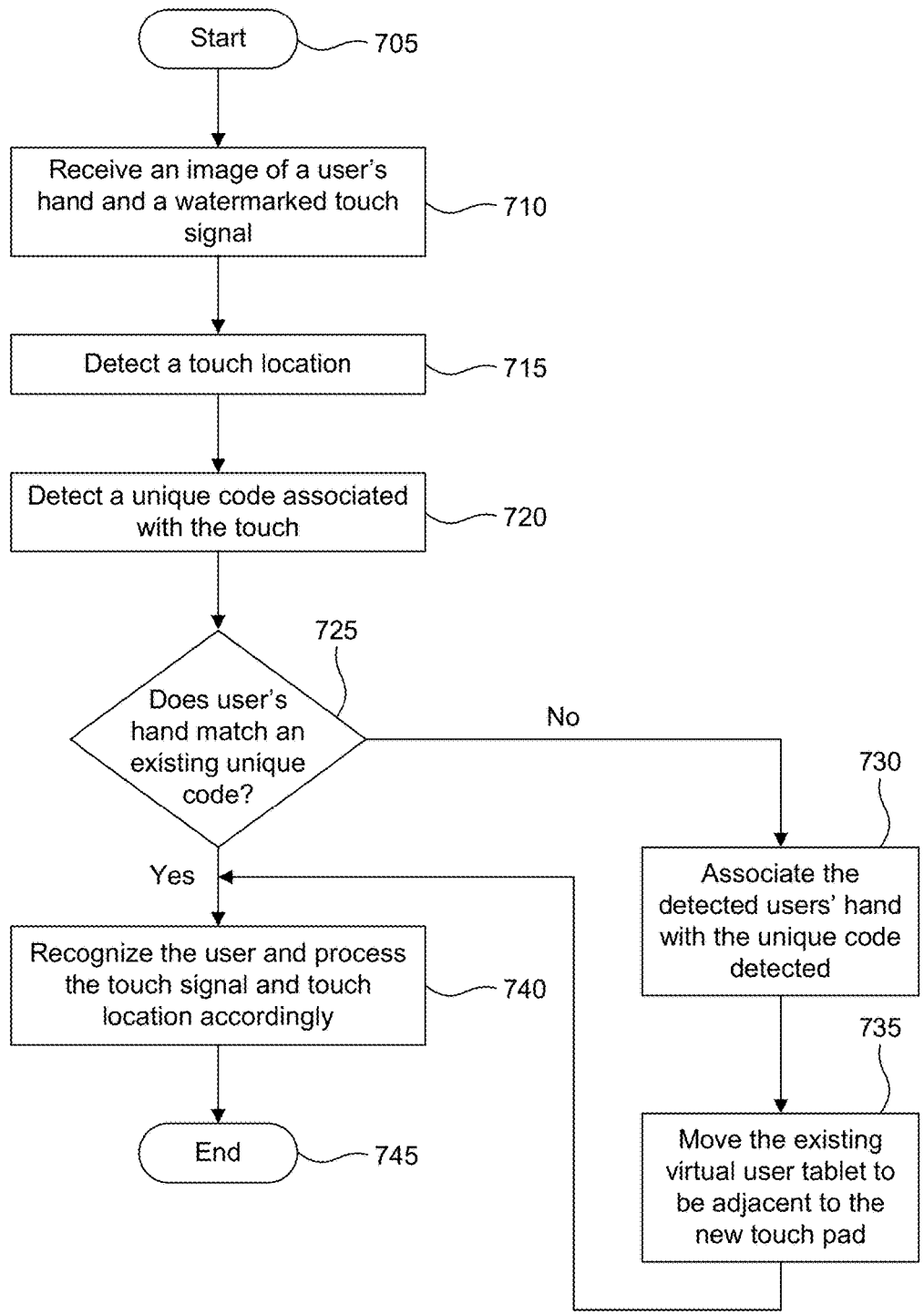
FIG. 7 illustrates a flow chart of a method for securely identifying multiple users on a large interactive PCAP touchscreen, according to an embodiment of the disclosure.

FIG. 7 illustrates a flow chart of a method for securely identifying multiple users on a large interactive PCAP touchscreen, according to an embodiment of the disclosure. Method 700 may be described in terms of elements from FIGS. 1, 2, and 6A-6B. It is to be appreciated not all steps may be needed to perform disclosure provided herein. Further, some of the steps may be performed simultaneously, or in a different order than that shown in FIG. 7, as will be understood by those skilled in the art. Two scenarios are described below for detecting and processing User 1's touch on a touchscreen. In the first scenario associated with FIG. 6A, User 1 remains at touch pad P1 and touches touchscreen 610*a*. In the second scenario associated with FIG. 6B, User 1 moves to a different location on the gaming table and touches touch pad P7.

Scenario 1: User 1 keeps touching pad P1 with one hand and then touches touchscreen 610.

Method 700 begins at step 705 and proceeds to step 710.

At step 710, touchscreen controller 220 receives an image of User 1's captured hand image via touch pad P1. In addition, touchscreen controller 220 receives a watermarked touch signal via touchscreen 610*a*. User 1 may have touched virtual tablet A associated with touch pad P1, and virtual tablet A may be a fast scan area. The watermarked touch signal is a received touch signal that includes the touch location as well as the unique code associated with the user's associated touch pad. The unique code does not interfere with the touch signal data received, and touchscreen controller 220 can determine the unique code from the detected touch signal. Method 700 proceeds to step 715.

At step 715, touchscreen controller 220 processes the watermarked touch signal and detects a touch location. Method 700 proceeds to step 720.

At step 720, touchscreen controller 220 detects a unique code associated with the watermarked touch signal, (e.g., the unique code associated with touch pad P1). Method 700 proceeds to step 725.

At step 725, a determination is made whether User 1's captured hand image is paired with the detected unique code (e.g., determine if User 1 is currently associated with touch pad P1.) When User 1's captured hand image is confirmed as being associated with touch pad P1, method 700 proceeds to step 740. When User 1's captured hand image is not associated with the currently detected unique code (e.g., User 1 was previously using a different touch pad), method 700 proceeds to step 730. At step 740, touchscreen controller 220 recognizes User 1's touch and processes the detected touch signal and touch location accordingly. Method 700 proceeds to step 745 and ends.

Returning to step 730, User 1's captured hand image is not associated with the currently detected unique code; User 1's captured hand image is then dis-associated with touch pad P1 and associated with the unique code of a different touch pad. Method 700 proceeds to step 735. At step 735, touchscreen controller 220 moves virtual tablet A associated with User 1 to be adjacent and in proximity to the different touch pad. Virtual tablet A may be a fast scan area. Method 700 proceeds to step 740.

At step 740, touchscreen controller 220 recognizes User 1's touch and processes the detected touch signal and touch location accordingly. Method 700 proceeds to step 745 and ends.

Scenario 2: User 1 moves to a different location as shown in FIG. 6B and touches touch pad P7 with one hand and then touches touchscreen 610*b*. Each user using a touch pad P1-P6 has associated with them a virtual user tablet A-F. Note that touch pad P7 is not in use and thus there is no virtual user tablet G. Note that at the beginning of method 700, Virtual Tablet A may not be visible on touchscreen 610*b* when User 1 moves to and places a hand on touch pad P7.

Method 700 begins at step 705 and proceeds to step 710.

At step 710, touchscreen controller 220 receives an image of User 1's captured hand image via touch pad P7. In addition, touchscreen controller 220 receives a watermarked touch signal via touchscreen 610*b*. The watermarked touch signal is a received touch signal that includes the touch location as well as the unique code associated with the user's associated touch pad. The unique code does not interfere with the touch signal data received, and touchscreen controller 220 can determine the unique code from the detected touch signal. Method 700 proceeds to step 715.

At step 715, touchscreen controller 220 processes the watermarked touch signal and detects a touch location. Method 700 proceeds to step 720.

At step 720, touchscreen controller 220 detects a unique code associated with the watermarked touch signal, (e.g., the unique code associated with touch pad P7). Method 700 proceeds to step 725.

At step 725, a determination is made whether User 1's captured hand image is paired with the detected unique code (e.g., determine if User 1 is currently associated with touch pad P7.) When User 1's captured hand image is confirmed as being associated with touch pad P1, method 700 proceeds to step 740. In this scenario, User 1's captured hand image is not associated with the currently detected unique code of touch pad P7 (e.g., User 1 was previously using touch pad P1), method 700 proceeds to step 730.

At step 730, when User 1 has moved to a different touch pad (e.g., touch pad P7) as shown in FIG. 6B, User 1's captured hand image is then dis-associated with touch pad P1 and associated with the unique code of touch pad P7. Method 700 proceeds to step 735.

At step 735, touchscreen controller 220 moves virtual tablet A associated with User 1 to be adjacent and in proximity to touch pad P7. Virtual tablet A may be a fast scan area. Method 700 proceeds to step 740.

At step 740, touchscreen controller 220 recognizes User 1's touch and processes the detected touch signal and touch location accordingly. Method 700 proceeds to step 745 and ends.

Figure 6C:
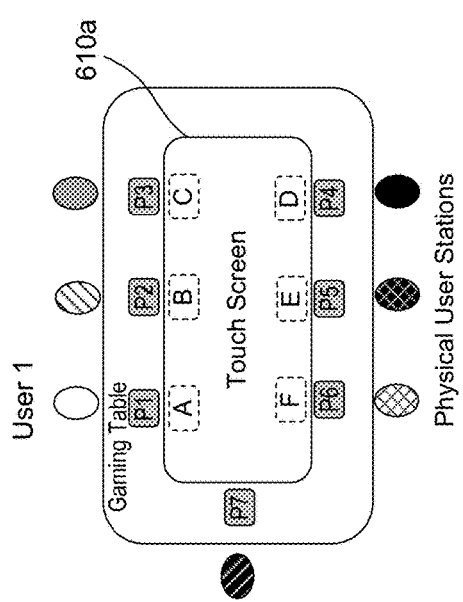
Figure 6D:
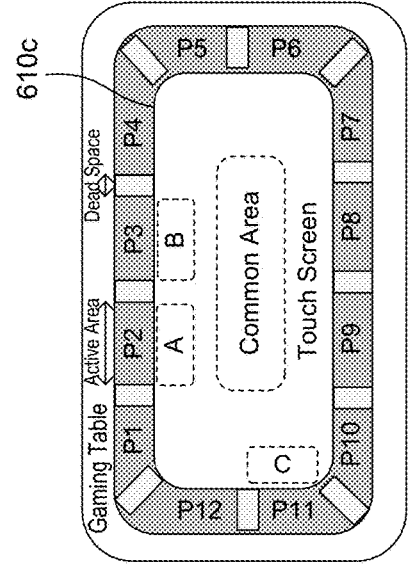

FIG. 6C illustrates a gaming table with segmented touch pad areas, according to an embodiment, and FIG. 6D illustrates a gaming table with a continuous touch pad area, according to an embodiment.

In an embodiment the controller is further configured to: identify a user associated with the at least one first area. In an embodiment, to identify the user, the controller receives a watermarked touch signal from the at least one first area, wherein the watermarked touch signal comprises a touch signal and a unique signal. The controller analyzes the watermarked touch signal, detects a touch location, and detects the unique signal, where the unique signal is associated with the user.

In an embodiment, the unique signal is associated with a drive frequency of the controller. In an embodiment, the unique signal includes a unique code modulated to the drive frequency, and the unique signal is a low voltage signal. In an embodiment, the unique code is an orthogonal code. In another embodiment, the unique signal is associated with one drive frequency of the controller, wherein a second unique signal is associated with a different frequency of the controller. In a embodiment, the one drive frequency is paired with a code, and the combination of the one drive frequency and the code is unique. In another embodiment, the code is an orthogonal code.

In an embodiment, the system includes a touch pad coupled to the touchscreen, where the touch pad captures an identifying image of a hand of the user, and transfers the unique signal to the user when the user touches the touch pad, where the at least one first area is positioned in proximity with the touch pad. In another embodiment, the identifying image of the hand is a capacitive image. Further, the touch pad may include a camera, where the camera captures the identifying image of the hand. In another embodiment, when the user touches the second area, the controller receives a second watermarked touch signal from the second area, where the second watermarked touch signal comprises a second touch signal and the unique signal, and analyzes the second watermarked touch signal to detect the unique signal. In an embodiment, the controller maintains user identification through signal communication to and from a device in contact with the user. Further, the controller also detects a user touch in the at least one first area, receives a signal from the device, where the signal includes: a unique serial number identifying the user, and a detected driver signal corresponding to the user touch. The controller also correlates the user touch detected with the user.

In another example, touch data from one-hand, five-finger touches or entire palm presses may be detected on touchscreen 210 or a fast scan area on touchscreen 210, and processed to distinguish between individuals. This approach takes advantage of unique unconscious touch characteristics among users including variations of touch force, distances among fingers etc. Based on these different characteristics, an individual or user may be identified. A larger sample of touches from a user can increase the accuracy of the user identification. From a multi-touch such as 5 simultaneous touches from a user, the information such as distance ratio among each finger, pressure ratio of each fingers, and amplitude ratio of anti-ghost signals and so on, can be used to identify an individual by processing and analyzing the collected data via feature based user clarification. Optionally, in cases where the analysis involves intensive computing, special processors supporting parallel or vector processing may be used. Since only multi-touch position and pressure information are used for differentiating between users without any hardware addition, individual identification occurs in a low cost and straightforward manner.

In another example, touch data from one-hand, five-finger touches or entire palm presses may be detected on touchscreen 210 or a fast scan area on touchscreen 210, and processed to distinguish between individuals. This approach takes advantage of unique unconscious touch characteristics among users including variations of touch force, distances among fingers etc. Based on these different characteristics, an individual or user may be identified. A larger sample of touches from a user can increase the accuracy of the user identification. From a multi-touch such as 5 simultaneous touches from a user, the information such as distance ratio among each finger, pressure ratio of each fingers, and/or amplitude ratio of anti-ghost signals and so on, can be used to identify an individual by processing and analyzing the collected data via feature based user clarification. Since only multi-touch position and pressure information are used for differentiating between users without any hardware addition, individual identification occurs in a low cost and straightforward manner.

In an embodiment, the controller identifies the user, by receiving a touch signal from the at least one first area, detecting a touch location, and detecting a palm print, where the palm print is associated with the user.

Figure 8:
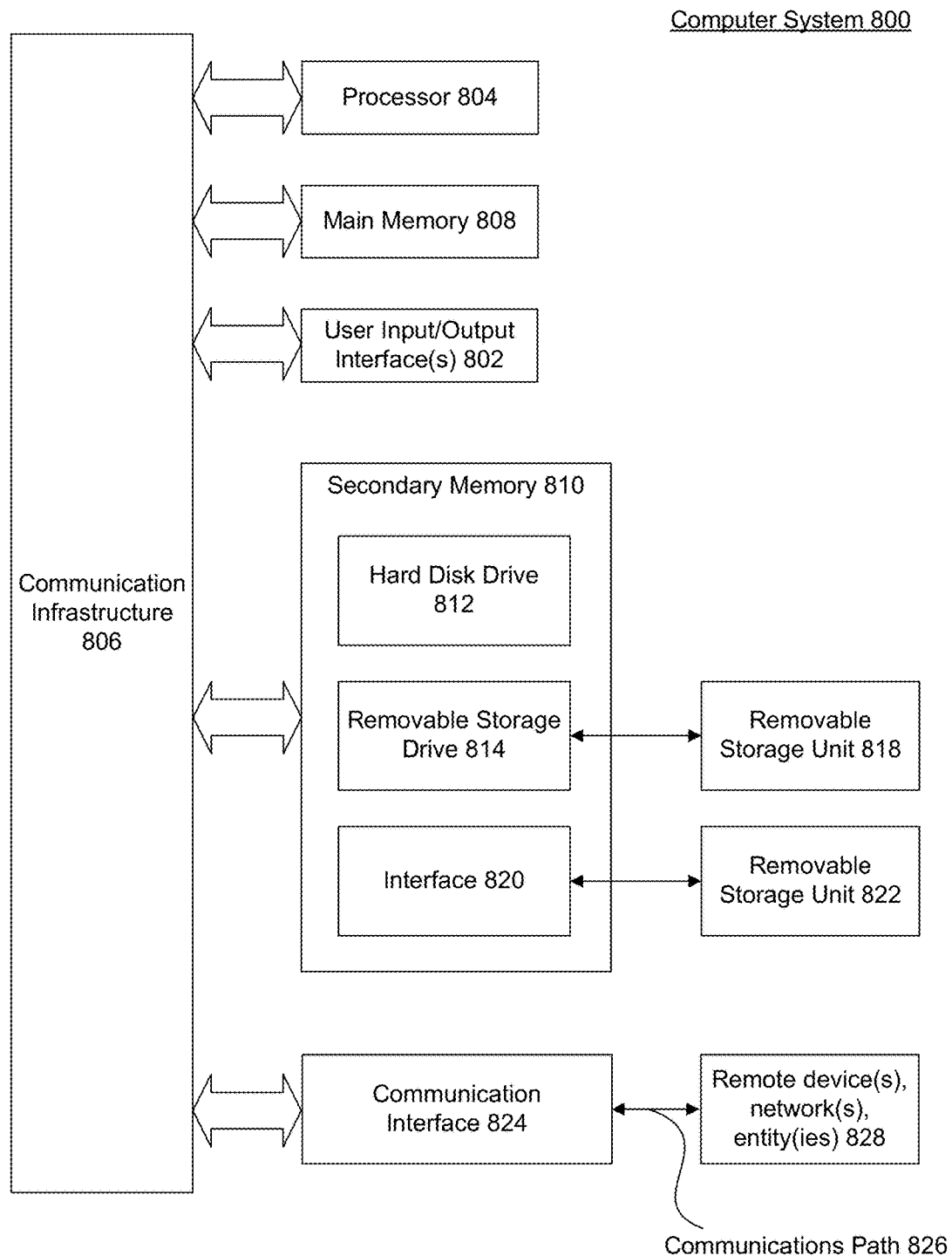
FIG. 8 is an example computer system useful for implementing various embodiments.

Various embodiments can be implemented, for example, using one or more well-known computer systems, such as computer system 800 shown in FIG. 8. Computer system 800 can be any well-known computer capable of performing the functions described herein. Computer system 800 may be internal or external to system 100 as discussed above.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 802, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 414 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A system, comprising:
a touchscreen; and
a controller coupled to the touchscreen, the controller configured to:
adjust performance of the touchscreen through dynamically setting a controller parameter to support altered touch reporting in at least one first area of the touchscreen relative to a second area of the touchscreen;
control enablement of touch detection for the at least one first area according to performance characteristics associated with an application operating in the second area; and
identify a user associated with the at least one first area, wherein the controller is configured to:
receive a watermarked touch signal from the at least one first area, wherein the watermarked touch signal comprises a touch signal and a unique signal;
analyze the watermarked touch signal;
detect a touch location associated with the touch signal; and
detect the unique signal, wherein the unique signal is associated with the user.

2. The system of claim 1, wherein the unique signal is associated with one drive frequency of the controller and wherein a second unique signal is associated with a different drive frequency of the controller.

3. The system of claim 1, wherein the unique signal is associated with a unique code.

4. The system of claim 3, wherein the unique code is an orthogonal code.

5. The system of claim 1, wherein the unique signal is associated with a unique combination of a drive frequency of the controller and a code.

6. The system of claim 5, wherein the code is an orthogonal code.

7. The system of claim 1, wherein to detect the unique signal, the controller is configured to:
receive the unique signal from a device that the user touches;
receive an identifier of the user from the device;
associate the identifier of the user with the device; and
position the at least one first area to be in proximity to the device.

8. The system of claim 7, wherein the controller is further configured to:
receive a second unique signal from a second device that the user touches;
determine that the second unique signal is associated with the identifier of the user;
dis-associate the user with the device;
associate the user with the second device; and
position the at least one first area to be in proximity to the second device.

9. The system of claim 7, wherein the identifier of the user is a hand image and the device is a touch pad.

10. The system of claim 9, wherein the hand image is a capacitive image, and the controller is further configured to extract features from the capacitive image that uniquely identify the user.

11. The system of claim 7, wherein the identifier of the user comprises electrical impedance measurements at differing frequencies.

12. The system of claim 7, wherein the controller is further configured to:
receive a second unique signal from the device;
determine that the second unique signal is not associated with the user;
dis-associate the identifier of the user with the device;
associate a second identifier of a second user associated with the second unique signal with the device; and
position a third area associated with the second user to be in proximity to the device.

13. A method, comprising:
adjusting performance of a touchscreen through dynamically setting a controller parameter to support altered touch reporting in at least one first area of the touchscreen relative to a second area of the touchscreen;
controlling enablement of touch detection for the at least one first area according to performance characteristics associated with an application operating in the second area; and
identifying a user associated with the at least one first area, comprising:
receiving a watermarked touch signal from the at least one first area, wherein the watermarked touch signal comprises a touch signal and a unique signal;
analyzing the watermarked touch signal;
detecting a touch location associated with the touch signal; and
detecting the unique signal, wherein the unique signal is associated with the user.

14. The method of claim 13, wherein the detecting the unique signal comprises:
receiving the unique signal from a device that the user touches;
receiving an identifier of the user from the device;
associating the identifier of the user with the device; and
positioning the at least one first area to be in proximity to the device.

15. The method of claim 14, further comprising:
receiving a second unique signal from a second device that the user touches;
determining that the second unique signal is associated with the identifier of the user;
dis-associating the user with the device;
associating the user with the second device; and
positioning the at least one first area to be in proximity to the second device.

16. The method of claim 14, further comprising:
receiving a second unique signal from the device;
determining that the second unique signal is not associated with the user;
dis-associating the identifier of the user with the device;
associating a second identifier of a second user associated with the second unique signal with the device; and
positioning a third area associated with the second user to be in proximity to the device.

17. A non-transitory computer readable medium having stored therein one or more instructions that, when executed by one or more processors, cause the one or more processors to perform operations, the operations comprising:
adjusting performance of a touchscreen through dynamically setting a controller parameter to support altered touch reporting in at least one first area of the touchscreen relative to a second area of the touchscreen;
controlling enablement of touch detection for the at least one first area according to performance characteristics associated with an application operating in the second area; and
identifying a user associated with the at least one first area comprising:

receiving a watermarked touch signal from the at least one first area, wherein the watermarked touch signal comprises a touch signal and a unique signal;

analyzing the watermarked touch signal;

detecting a touch location associated with the touch signal; and detecting the unique signal, wherein the unique signal is associated with the user.

18. The non-transitory computer readable medium of claim 17, wherein the detecting the unique signal, comprises:

receiving the unique signal from a device that the user touches;

receiving an identifier of the user from the device;

associating the identifier of the user with the device; and positioning the at least one first area to be in proximity to the device.

19. The non-transitory computer readable medium of claim 18, wherein the operations further comprise:

receiving a second unique signal from a second device that the user touches;

determining that the second unique signal is associated with the identifier of the user;

dis-associating the user with the device;

associating the user with the second device; and positioning the at least one first area to be in proximity to the second device.

20. The non-transitory computer readable medium of claim 18, wherein the operations further comprise:

receiving a second unique signal from the device;

determining that the second unique signal is not associated with the user;

dis-associating the identifier of the user with the device;

associating a second identifier of a second user associated with the second unique signal with the device; and positioning a third area associated with the second user to be in proximity to the device.

\* \* \* \* \*